Oct. 27, 1936.  P. N. WILSON  2,059,181

SELF CONTAINED TAPER ROLLER BEARING

Filed July 1, 1935

INVENTOR:
Paul N. Wilson,
HIS ATTORNEYS

Patented Oct. 27, 1936

2,059,181

UNITED STATES PATENT OFFICE 2,059,181

SELF CONTAINED TAPER ROLLER BEARING

Paul N. Wilson, Canton, Ohio, assignor to The Timken Roller Bearing Company, Canton, Ohio, a corporation of Ohio Application July 1, 1935, Serial No. 29,267

3 Claims. (Cl. 308—214)

My invention relates to taper roller bearings and has for its principal object to improve the construction of taper roller bearings of the self contained type wherein the taper rollers and the race members constitute a unit handled assembly.

The invention consists principally in providing for the bearing a casing in which the outer bearing member is seated and which is provided with a snap cover that also engages the inner bearing member so as to hold the parts in assembled position. The invention further consists in the self contained bearing and in the parts and combinations of parts hereinafter described.

In the accompanying drawing.

Figure 1:
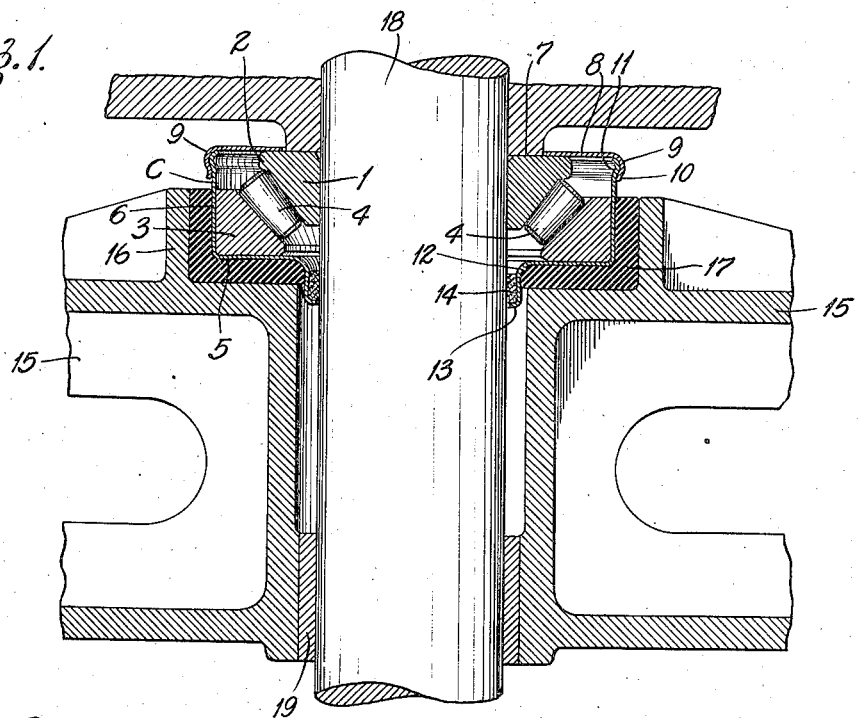
Fig. 1 is a longitudinal sectional view of a bearing embodying my invention.
Figure 2:
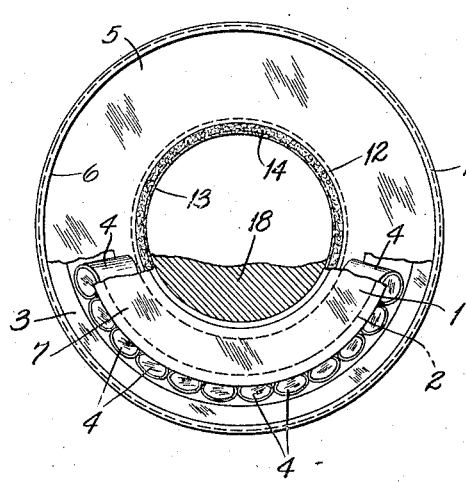
Fig. 2 is an elevation of the casing member and fragment of the bearing with cover removed.
Figure 3:
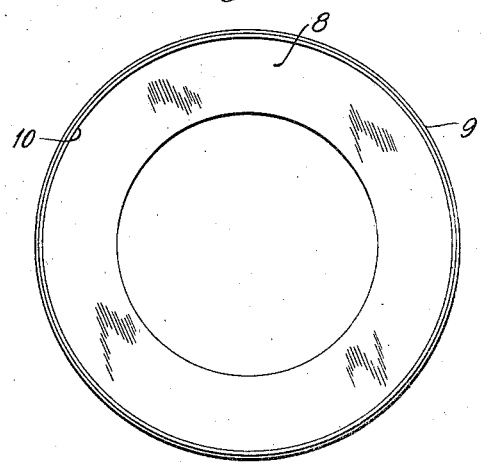
Fig. 3 is an elevation of the cover for said casing.

The drawing illustrates a taper roller bearing of the full series roll type, including a cone 1 or inner bearing member having a thrust rib 2 at its large end, a cup 3 or outer bearing member and a full series of conical rolls 4 between said bearing members. The cage commonly used for the rolls of taper roller bearings is dispensed with, although my invention is not inconsistent with the use of a cage.

There are many obvious advantages in making a unit handled assembly of such a bearing, but the difficulty and expense involved in most unit handled assemblies make them impractical for general use. The present invention is a simple and inexpensive self contained bearing construction.

As illustrated, the cup 3 or outer bearing member is seated in a casing C of angular section, said casing being easily made from a light inexpensive metal, as by stamping. The bottom 5 of the casing forms a seat for the end of said cup 3 and the side wall 6 of the casing projects beyond the cup 3 or outer bearing member about to the plane of the end face 7 of the cone 1 or inner bearing member. A perforated cover plate 8 is mounted against said end face 7 of said cone 1 and has a curved flange 9 with a flared edge portion 10 that is adapted to be snapped over the beaded edge 11 of the casing wall 6, thus holding the parts of the bearing in assembled relation.

The casing C may be provided with a projecting sleeve portion 12 with a flanged edge 13 constituting a container for a suitable felt or other closure member 14. Such details of construction will depend upon the use to which the completed bearing is put, the drawing illustrating a street railway car center plate bearing wherein a bolster 15 is provided with an annular rib 16 forming a seat in which is mounted a rubber or other resilient cushion 17 in which the bearing casing C is seated. The center pin 18 extends through the cone 1 or inner bearing member, through the closure portion of the casing C and through a plain steady bearing 19 or sleeve in the lower portion of the bolster.

The above described construction makes the bearing a self contained assembly, it protects the parts of the bearing during shipment and it provides a mounting means for a lubricant retaining ring to hold lubricant within the bearing enclosure. Obviously, the details of construction of the casing will depend upon the use to which the bearing is to be put and numerous changes may be made from the construction shown without departing from the invention, so that I do not wish to be limited to the precise construction shown.

What I claim is:

1. A self contained taper roller bearing comprising a bearing cone having an axial bore, a bearing cup, conical rollers therebetween, a casing having a seat for one end of said cup, an annular sleeve projecting from the inner portion of said seat coaxial with the bore of said cone, the side wall of said casing enclosing said cup and extending beyond the other end thereof and having a beaded edge and a perforated cover plate engaging the end of said cone and having a flanged margin fitting over the beaded edge of said casing.

2. A self contained taper roller bearing comprising a bearing cone, a bearing cup, conical rollers therebetween, said cone having a thrust rib at the large end of its raceway and being otherwise free from radial projections so as to be removable from the assembled cup and rollers, a casing having a seat for one end of said cup and an annular wall fitting the cup and extending beyond the other end of the cup about to the plane of the end of said bearing cone and a cover plate engaging therefor the end of said cone, the edge of said plate having interlocking engagement with the end of said casing wall thereby maintaining the bearing in assembly.

3. A self contained taper roller bearing comprising a bearing cone having an axial bore, a bearing cup, conical rollers therebetween, said cone having a thrust rib at the large end of its raceway and being otherwise free from radial projections so as to be removable from the assembled cup and rollers, a casing having a seat for one end of said cup, an annular sleeve projecting from the inner portion of said seat coaxial with the bore of said cone, the side wall of said casing enclosing said cup and extending beyond the other end thereof about to the plane of the end of said cone and having a beaded edge and a perforated cover plate engaging the end of said cone and having a flanged margin fitting over the beaded edge of said casing thereby maintaining the bearing in assembly.

PAUL N. WILSON.